United States Patent [19]
Cavaille et al.

[11] Patent Number: 6,103,790
[45] Date of Patent: Aug. 15, 2000

[54] CELLULOSE MICROFIBRIL-REINFORCED POLYMERS AND THEIR APPLICATIONS

[75] Inventors: Jean-Yves Cavaille, Claix; Henri Chanzy, La Tronche; Veronique Favier, Bourg-la-Reine; Benoit Ernst, Beaumont-le-Rocher, all of France

[73] Assignee: Elf Atochem S.A., France

[21] Appl. No.: 08/702,533

[22] PCT Filed: Feb. 28, 1995

[86] PCT No.: PCT/FR95/00234

§ 371 Date: Nov. 1, 1996

§ 102(e) Date: Nov. 1, 1996

[87] PCT Pub. No.: WO95/23824

PCT Pub. Date: Sep. 8, 1995

[30] Foreign Application Priority Data

Mar. 1, 1994 [FR] France ................................. 94 02315

[51] Int. Cl.⁷ ........................................................... C08L 1/02
[52] U.S. Cl. ................................................. 524/13; 524/35
[58] Field of Search ................................. 524/13, 14, 35

[56] References Cited

U.S. PATENT DOCUMENTS

| | | | |
|---|---|---|---|
| 4,452,722 | 6/1984 | Turbak et al. | 252/311 |
| 4,483,743 | 11/1984 | Turbak et al. | 162/100 |
| 4,487,634 | 12/1984 | Turbak et al. | 524/35 |
| 4,842,924 | 6/1989 | Farris et al. | 428/221 |
| 5,102,601 | 4/1992 | Farris et al. | 264/183 |

FOREIGN PATENT DOCUMENTS

| | | |
|---|---|---|
| 191296 | 11/1983 | Japan ........................................ 524/35 |
| 60-250079 | 12/1985 | Japan . |
| 2195672 | 4/1988 | United Kingdom . |
| WO 93/10172 | 5/1993 | WIPO . |

OTHER PUBLICATIONS

Polymer Composites, vol. 10, No. 2, Apr. 1989, pp. 69–77, Future Prospects for Wood Cellulose as Reinforcement in Organic Polymer Composites, P. Zandrecki, et al.

"Cellulose in Polymeric Composites", Klason, et al., Composite Systems From Natural and Synthetic Polymers, L. Salmen, pp. 65–74.

PCT/IB338 with English Translation of PCT/IPEA/409 dated Feb. 28, 1996.

*Primary Examiner*—Peter A. Szekely
*Attorney, Agent, or Firm*—Bell, Boyd & Lloyd

[57] ABSTRACT

Cellulose microfibril reinforced polyers, corresponding latices, powders, films and rods, and uses thereof. Polymer/cellulose composites are prepared using individualized cellulose microfibrils with a high form factor, e.g., tunicin microfibrils, as the reinforcement. For this purpose, reinforced latices consisting of a polymer latex and a stable aqueous suspension of said microfibrils are used. Said polymers have a wide variety of uses, particularly in paints and nanocomposites.

28 Claims, 4 Drawing Sheets

CELLULOSE MICROFIBRIL-REINFORCED POLYMERS AND THEIR APPLICATIONS

FIELD OF THE INVENTION

The present invention relates to polymer matrixes reinforced with cellulose fibers, to their production in the form of aqueous suspensions, and to certain uses.

BACKGROUND OF THE INVENTION

Industry generally calls for composite materials consisting of a polymer matrix whose properties, in particular the mechanical properties, must be adapted by incorporation of fillers or reinforcements. Certain of these composite materials are produced from copolymer latexes and fibers. These are the materials to which the present invention relates. With regard to reinforcement, the advantage of cellulose, in particular particles of microcrystalline cellulose, has already been recognized, for the reinforcement of polymers from using their solutions, for example, the aqueous solutions of carbamide resins mentioned in WO 93/10172, or else for the production of compositions for nail polishes (U.S. Pat. No. 4,891,213) of which the secondary but important properties such as transparency or luster of the composite have been assessed. Also envisaged has been the filling or reinforcing with cellulose by the ordinary methods of compounding of thermoplastic resins (for examples see: Composite Systems from Natural and Synthetic Polymers, by Kalson et al. in Materials Science Monographs, 36, Elsevier 1986, or else Future Prospects for Wood Cellulose as Reinforcement in Organic Polymer Composites, by Zadorecki et al. in Polymer Composites, 10/2, p. 69, 1989).

DISCLOSURE OF THE INVENTION

It has now been found that it is possible to produce composites of completely unexpected quality consisting of a thermoplastic polymer and a reinforcement of individualized cellulose microfibrils, with as means of production, latexes incorporating said cellulose microfibrils. For the convenience of language, these latexes will be described in the shortened form of reinforced latexes.

In the sense of the present invention, individualized cellulose microfibrils is understood to mean forms of cellulose which are present in the form of more or less rigid elements, with an average length greater than a micrometer, whose diameter is between approximately 2–30 nm, and preferably greater than 7 nm, with a aspect ratio, that is to say the length/diameter ratio which is always greater than 60, and whose degree of crystallinity is greater than 20%, and preferably greater than 70%.

Generally, cellulose is present in the form of a hierarchy of structures. The cellulose molecules are always biosynthesized in the form of microfibrils, which are in turn assembled into fibers, films, walls, etc. The cellulose microfibril can be considered to be an important structural element of natural cellulose. It consists of an assembly of cellulose chains whose average degree of polymerization is greater than 1,000 and whose degree of perfection in their parallel organization is expressed in its crystallinity percentage. It is obtained from crude cellulose whose content with respect to the dry weight of the cell walls of which it constitutes the reinforcement ranges from 30% (parenchymal cellulose) to 95% (tunicin cellulose). It is therefore necessary to apply a dilaceration, bleaching and cleansing treatment to the cellulose raw material in order to obtain a crude cellulose, and then to obtain the microfibrils from it by powerful shearing in a homogenizer. The plant cellulose microfibrils are associated together in a parallel manner in the secondary walls of interlaced in a disordered manner in the primary walls. The dissociation of the secondary walls is difficult; in contrast, in the primary walls, it is much easier. The parenchyma is an example of a tissue only containing the primary wall. A model for treatment of animal cellulose is given in Examples 1 and 1bis for obtaining tunicin microfibrils. For obtaining parenchymal microcellulose, it is possible to apply the treatments recommended by Weibel (U.S. Pat. No. 4,831,127) for obtaining crude cellulose.

All the microfibrils do not develop the quality of reinforcement which is currently looked for, or at least do not develop it to the level recognized in the invention. The phenomenon of reinforcement comes from the fact that the microfibrils are dispersed in the polymer matrix, within which it organizes itself into a sort of lattice whose unit cell depends on their weight or volume fraction and on their dimensional characteristics. This property is connected with conditions of form: their diameter and their length which is assessed rather in its ratio to the diameter via a aspect ratio. This property is very greatly dependent on the individuality of the microfibrils, which can be seen clearly in the microscopic images (see, for example, FIG. 1) but more simply by observation that their aqueous suspensions at a concentration of a few percent are colloidal. This property of reinforcement is also connected, although to a lesser degree, with their rigidity, which is itself strictly connected with their crystallinity, whose value increases as their surface area/volume ratio decreases. This crystallinity is estimated in a well-known way by examination of the X-ray diffraction diagrams. The important corollary of the dependence of the reinforcement properties of the microfibrils is that it is considerably altered by their aggregation. The microfibrils which can be used for the invention are distinguished in this from what are ordinarily called microcrystalline celluloses, which result from hydrolysis of wood or cotton cellulose, particularly of its hydrochloric hydrolysis, of which the degree of polymerization is already clearly lower, and which above all are not individualized; microcrystalline celluloses which, when they undergo a suitable treatment for individualizing their elements, only provide microcrystals which, even if they more or less still have the diameter of the starting cellulose, are much shorter, for example, approximately 100 nm for wood cellulose (such is the case, for example, of the celluloses used by Boldizar et al., Prehydrolyzed Cellulose as Reinforcing Filler for Thermoplastics, Intern. J. Polymeric Mater., 1987, Vol. 11, 229–262).

For proper execution of the invention, it is desirable for the characteristics of the microfibrils revealed above to be exactly produced. The microfibrils which can be used for the invention generally consist of a series of microcrystals separated by zones of amorphous cellulose, the flexibility that they have coming, on one hand, from the length of the microcrystals, and on the other hand, from the presence of the amorphous intermediate segments. This definition which has been given for the microfibrils according to the invention also includes the very long cellulose monocrystals which are obtained with a aspect ratio greater than 60 by acid hydrolysis of natural cellulose fibers or fibrils, as is the case of tunicin. There are possibilities for balancing these characteristics; thus, long microfibrils with a certain flexibility may still be acceptable for the invention, as long as this does not hinder their individuality, or else microfibrils with a small diameter, which, at comparable weight content with respect to that of microfibrils with a larger diameter, compensate for their lack of rigidity by a larger density in number and the formation of a denser network. These are choices which are up to the expert in the field who, in the particular cases presented to him, always knows how to balance the advantages and disadvantages, including the economic advantages and disadvantages, of each solution. The indications which follow will help in his choices.

The sources of microfibrils are diverse. The plant parenchyma provides microfibrils with diameters of 2–3 nm; those of wood are approximately 3.5 nm. The long cellulose microfibrils of bacterial origin have diameters of approximately 5–7 nm. The microfibrils of animal origin, and in particular those which can be obtained from tunicin, which constitutes the major part of the envelope of marine animals belonging to the family of the Tunicata (for example, the edible species of *Halocynthia roeretzi* or *Halocynthia aurantium* of Japan or *Microcosmus fulcatus* of the Mediterranean—the sea squirts) have a diameter of approximately 10–20 nm. Others, also with a larger diameter, can be taken from algae with cellulose-containing walls.

Figure 1:
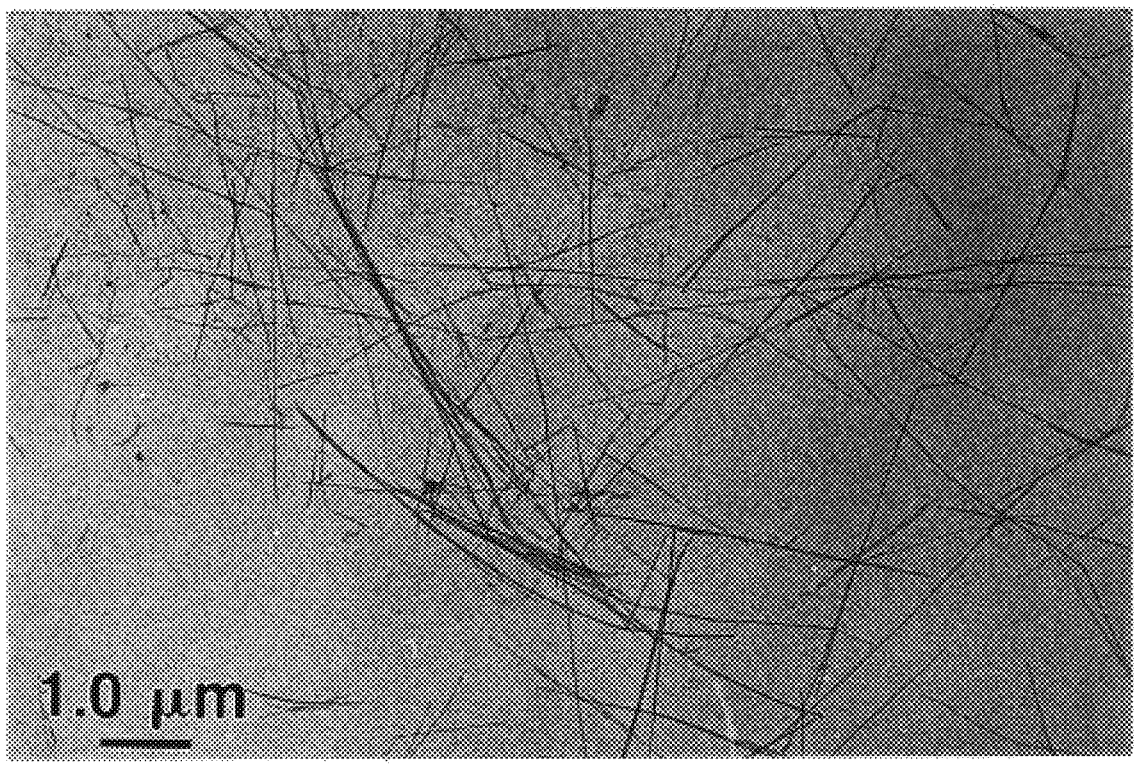
FIG. 1 is a view of tunicin microfibrils.

The tunicin microfibrils, whose image is given in FIG. 1, correspond completely to this definition of the microfibrils according to the invention. They contain few defects and can be considered to be true microcrystals to which there is agreement in attributing an elastic modulus on the order of 130 GPa, which should give the level of breaking stress values on the order of 13 GPa for a microfibril.

Parenchymal cellulose is present in the form of long microfibrils whose diameters are between 2–3.5 nm, which are organized in a disordered manner in the cell walls of primary type. Certain ones of these microfibrils are associated in bundles of 10–20 units; others are individual.

The cellulose microfibrils of bacterial origin have a very high aspect ratio, and their crystallinity is lower.

The cellulose microfibrils are used according to the invention in the form of aqueous dispersions as produced by homogenizers. It can occur, and even rather frequently, that the suspensions which are obtained in this way are flocculent, and therefore that the microfibrils lose their individuality in them. It is then necessary to give them a stabilization treatment. Thus, the process for preparation of microfibrils as described in the international application WO 93/10172 consists of combining disintegration of the cellulose, subjecting it to a powerful homogenizer and an acid treatment capable of providing the microfibrils with electric surface charges, without consequently modifying the order of magnitude of the initial degree of polymerization of the cellulose, for example, a treatment with sulfuric acid or phosphoric acid. It is possible to improve the dispersion of the aqueous suspensions thus obtained by subjecting them to ultrasound.

The suspensions with a concentration of up to 0.3% microfibrils are translucent. Observation between two crossed polarizers with stirring of the suspensions reveals the presence of numerous birefringent areas corresponding to an ordering in the form of liquid crystals. These areas of birefringence become difficult to observe in suspensions with concentrations greater than 0.6% because of their opaqueness. The suspensions of cellulose microfibrils also have remarkable rheological properties. Their viscosity is already quite considerable for concentrations on the order of 1–2%, and certain ones can have a thixotropic behavior. Such suspensions can be used directly for the preparation of latexes called "reinforced latexes" which will now be spoken of.

In the sense of the present invention, "reinforced latexes" is understood to mean aqueous compositions which contain at the same time, in suspension, an amorphous thermoplastic polymer and individualized cellulose microfibrils, the percentage of microfibrils with respect to the polymer matrix being 15% or less and even preferably less than 10%. They are obtained very simply by mixing with stirring the two aqueous media, one, the latex containing the polymer spheres, and the other, the aqueous suspension of cellulose microfibrils, in the desired proportions. Their main value is that they are a very convenient vehicle or the material constituted by the final result of their evaporation and which is a polymer composition loaded uniformly and regularly with individualized cellulose microfibrils whose mechanical and thermomechanical properties are absolutely remarkable and unexpected (these materials will be described subsequently under the name of polymer/microfibril composite materials). Besides this role of reinforcement of the polymer matrix, the microfibrils provide the reinforced latex itself with a very considerable thickening function, in the aqueous compositions such as paints, inks, varnishes, compositions for aqueous adhesives and ground surface coverings. The polymer latexes with which the reinforced latexes of the invention are produced consist of particles of thermoplastic polymers, in the form of spheres, in colloidal dispersion in water. For certain needs which the invention can meet, for example, the formulation of paints, the formation of a film by coalescence is advantageously between −40° C. and +90° C., but other uses can call for thermoplastics whose $T_g$ values are outside these limits. These polymers can be of quite variable chemical composition. Of particular interest here are butyl polyacrylate, polystyrene, and their copolymers, but this is in no way a limitation of the invention which can without difficulty be extended to other polymer latexes, particular to the vinyl latexes. The corresponding latexes are obtained by the techniques of emulsion polymerization which are well known to the expert in the field. They are industrially available.

From these reinforced latexes, various types of composite materials are easily produced, to which the present invention also relates, according to an operation which in its principle is none other than evaporation of the latex, an operation which is extraordinarily simple if one compares it with the traditional method of dispersion of fibers in a polymer mass. The polymer/microfibril composite materials, when their microfibril content does not exceed 2% and when they are examined in small thicknesses (approximately 2 mm), do not display any difference in appearance with respect to the polymer matrix, which is detectable by the naked eye or even by the optical microscope in ordinary light. This is not true of their mechanical properties. The microfibrils, even in a small percentage, provide a remarkable reinforcing effect at small as well as at large deformations, and this effect is quite unexpectedly much greater than that produced by other types of cellulose structures (wood pulp, microcrystalline cellulose, etc.). From the physical standpoint of the materials, one observes no particular modification of the glass transition temperature, but the introduction of the cellulose microfibrils is expressed by an increase of the relaxation modulus in dynamic mechanics, an increase of the slope at the origin, in particular at high temperature, and an increase of the stress equivalent to the plasticity reversal point. This stress at the flow threshold increases greatly with the percentage of microfibrils. For example, it goes from 80 MPa for a nonreinforced film to 120 MPa for film containing 6% tunicin microfibrils. Which means in practice that the objects produced in this way can withstand much greater stresses without undergoing irreversible deformations. The composites according to the invention also have better stability at high temperature (in the diagrams of modulus values as a function of temperature, appearance of "rubber-like" plateaux which can be maintained at temperatures up to 225–230° C). In practice, the rubber-like modulus of the polymer is multiplied by 100 with a load of 6% microfibrils. These modifications are really extraordinary and so unlike what is known in prior art that the models ordinarily used for calculating the elastic modulus or shearing modulus of the composites (Halpin-Kardos model, J. C. Halpin and J. L. Kardos, Moduli of Crystalline Polymers Employing Composite Theory, Journal of Applied Physics, 43, 1972, 5, 2235–2241), or Tsai-Halpin model, (mentioned by Boldizar, above) cannot be used for the composite materials containing microfibrils according to the invention (with tunicin microfibrils, it would be necessary to introduce into the model form factors with a value 25 times greater than the experimental value!). In the application of the invention, the corresponding compositions contain less than 15% microfibrils in the sense of the invention, and preferably less than 10%.

It is thus possible to form thick films or objects by simple evaporation, by pouring the reinforced latex into a mold with an antiadhesive coating in order to allow for easy unsticking of these composites which have a high capacity to adhere. The film forming is then done in an oven, preferably at a temperature of approximately 30° C. The evaporation must occur very slowly in order to prevent untimely drying on the surface; for this, the humidity is maintained close to 100%, for example, under a perforated cover, and the operation lasts approximately fifteen days.

It is then possible to form objects made of polymer/cellulose fiber composites by lyophilization of the corresponding "reinforced latex", and then hot compression of the lyophilized product. This process of operation gives composites whose mechanical properties, although lower than those of the "evaporates," are remarkable for the low percentages of reinforcement with which one is operating. It is also possible to consider extruding the lyophilized product prepared with higher percentages of reinforcement. The process is particularly suitable for the production of very small structures, for example, connectors, in which the size of the cellulose microfibrils has no influence on the overall homogeneity of the part. The reinforcement consisting of tunicin microfibrils is preferable in this case because of their aspect ratio and their crystalline nature.

It is possible to obtain powders of composite material by lyophilization of the latex-cellulose mixture, according to the techniques which are known to the expert in the field. The powders thus obtained are to varying degrees compact depending on the glass transition temperature of the polymer matrix. They can be used as they are or else transformed into rod by extrusion. Powders and rods can in turn be used for the production of plates, films, or objects by compression or injection. It is also possible to formulate hot melts (hot melts) out of them.

The most direct application of the "reinforced latexes" is without a doubt the formulation of paints and products of the same type, namely inks, varnishes, adhesives, compositions for ground surface coverings, etc.

It offers various advantages, beginning with that of the possibility of using a polymer latex with a glass transition temperature lower than those ordinarily used. For example, by taking a latex with a glass transition temperature of 0° C. instead of 20° C. (usual $T_g$ of paints), one facilitates film forming (coalescence of the spheres of latex) at room temperature while maintaining good mechanical properties and thermal stability thanks to the addition of the cellulose microfibrils. This addition also allows one to benefit from a great increase of viscosity without the need for external viscosity agents (or at least limiting their quantities) which, when maintained in the film after evaporation, are damaging to its properties and to its proper storage. One observes moreover, and this is very much esteemed, that the paints formulated with the reinforced latexes of the invention have a lengthened recovery time and that the dried paint has a better resistance to abrasion.

EXAMPLE

The following examples will make the invention better understood.

Example 1

The example relates the preparation of microfibrils carrying sulfate loads, from tunicin.

After having roughly cleaned the pieces of sea squirt envelope, the pieces are put in 500 mL of a 5% aqueous solution of potash (KOH) for one night. They are then washed and whitened for 6 h at 80° C., with changing of the bath every 2 h. This bath is composed of 300 mL of a chlorite solution (17 g of $NaClO_2$ in 1 L of distilled water) mixed with 300 mL of an acetate buffer solution (27 g of NaOH added to 75 mL of $CH_3COOH$ and completed to 1 L with distilled water). This whitening treatment is repeated 3 times; it makes the pieces of sea squirts completely white.

The pieces of cellulose are then disintegrated in a Waring Blender mixer for 20 min; the concentration in terms of pieces is approximately 5% in the distilled water. One thus obtains a flocculent aqueous suspension of wall fragments, which is diluted to approximately 1% and introduced in successive cycles into a Gaulin 15N8TA mechanical homogenizer. The pressure of the apparatus is raised to 600 bar in stages in order to avoid blocking of the apparatus by the coarser fragments of cellulose. One should monitor the temperature rise taking care to limit it to 70° C. After approximately fifteen cycles, one obtains a homogeneous suspension containing small aggregates of fibers. A very simple test of the effectiveness of the operation consists of observing the increase of the thickness of the product. As an indication, the desired result is reached when the consistency of Vaseline is obtained with suspension with a concentration of approximately 2% cellulose.

The suspension coming from the homogenizer is then treated with sulfuric acid, in a proportion of 300 mL of concentrated sulfuric acid (95%) per 450 mL of the suspension coming from the homogenizer. The whole is maintained at 60° C. for 20 min. This suspension is then filtered using a sintered glass (porosity 1) in order to eliminate the coarse aggregates, after which the cellulose fibrils are retained using a filter with porosity of 4. One washes with distilled water and then with soda NaOH (0.1%) to neutrality of the suspension, and then again with distilled water. The cellulose is then deposited on the filter in the form of an aqueous pulp with a viscous consistency. It is redispersed in water;

the suspension is homogenized using a magnetic stirrer, and then subjected to ultrasound (Branson Sonifier B12) for approximately 5 min. The final suspension is ready for use, suitably homogeneous, nonflocculent, and stable for several weeks.

Example 1bis

The example relates the preparation of microfibrils carrying phosphate loads, from tunicin.

One proceeds as in Example 1 with the whitening of the sea squirts and the homogenizer treatment. 18 g of the 1% suspension coming from the homogenizer are then added to the phosphorylation medium consisting of 50 g of urea dissolved at 50° C. in 85% orthophosphoric acid. The mixture is then heated to 140° C. in an oil bath for 15–25 min. The protocol of cleaning, recovery, and dispersion of the microfibrils is the same as that of Example 1.

This "phosphoric" mode of preparation is preferable to the "sulfuric" mode of Example 1 for microfibrils other than those of tunicin and which do not have as good a resistance to acid hydrolysis.

Example 2
Preparation of reinforced latexes

Reinforced latexes with various percentages of microfibrils were prepared from suspensions of tunicin microfibrils with a dry extract content of 0.68% and a latex with a dry extract content of approximately 50% formed by emulsion polymerization of 34% styrene, 64% butyl acrylate, 1% acrylamide, and 1% acrylic acid; the corresponding polymer has a glass transition temperature $T_g$ of +0° C. The corresponding reinforced latexes result from their careful mixture with suspensions of cellulose microfibrils in proportions such that the percentage of the reinforcement in the copolymer is at the intended values. For example, one forms systems whose dry material contains approximately 6% microfibrils by carefully mixing 18.5 parts of latex and 81.5 parts of the suspension of microfibrils.

Example 3
Elastic moduli of the composites

Figure 2:
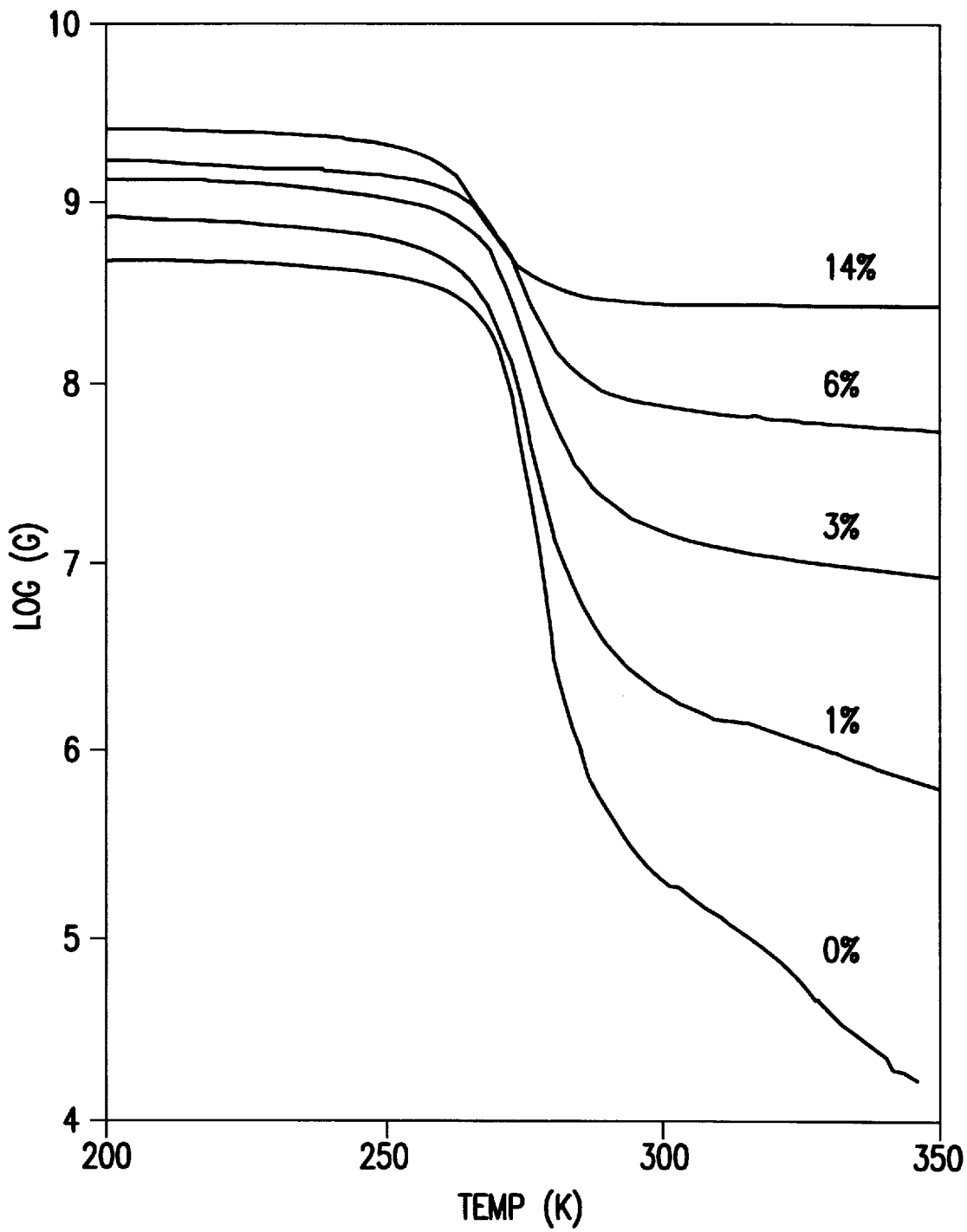
FIG. 2 is a graph showing the change of the real shearing modulus G' as a function of temperature.

From the latex of the preceding example, reinforced respectively by 6, 3, 1, and 0% tunicin microfibrils, and according to the technique of thick films by evaporation described above, small parallelepipeds were formed (length 15–20 mm, width 6–7 mm, thickness 0.5–2 mm), which were subjected to a dynamic analysis with the torsional pendulum (Metravib Instruments mechanical analyzer), in a temperature range from 200–350 K. (for a more detailed explanation on the viscoelastic behavior of the Sty-ABu copolymer, refer to J.-Y. Cavaille, R. Vassoille, G. Thollet, L. Rios, and C. Pichot, Structural Morphology of Polystyrene-polybutyl Acrylate Polymer—Polymer Composites Studied by Dynamic Mechanical Properties, Colloid & Polymer Science, 269 (1991), 248–258, and for the technology of the Metravib mechanical analyzer to J.-Y. Cavaille et al., A New Tool for Mechanical Spectrometry Analysis: the Micromechanical Analyzer, Spectra 2000, 16, No. 113, 1988, 37–45). It allows one to obtain curves of the moduli which are characteristic of the composite as a function of the temperature, in particular its real shearing modulus G' which is associated with the elastic energy stored in the material during deformation, the imaginary modulus G" which is associated with the viscous character and therefore with the energy dissipated during the test, and the magnitude tan(φ)=G"/G', tangent of the loss angle, is the interior friction coefficient characterizing the ability of the material to dissipate energy when it is subjected to a cyclic stress. FIG. 2 represents the change of the real shearing modulus G' as a function of the temperature. The dynamic behavior of the tested composite samples is typical of that of a polymer, with a drop of the shearing modulus during the glass transition, framed by two plateaux, one at the low temperatures (T<$T_g$) corresponding to the glass domain and the other at the high temperatures (T>$T_g$) corresponding to the rubber-like domain. One observes that the glass transition temperature $T_g$ is practically not affected by the load of microfibrils. At the temperatures higher than $T_g$, the reinforcing effect is remarkable, if it is judged by comparison with the modulus of the polymer alone which drops to $10^5$ Pa. The relaxation modulus of the film containing 6% tunicin microfibrils is more than 100 times greater than the relaxed modulus of the pure matrix. Moreover, this modulus remains perfectly constant up to 500 K., the temperature at which the cellulose begins to break down. Contrary to the case of the pure matrix, the polymer chains do not yield with the temperature. The thermal stability of the material is thus improved.

Example 4

Figure 3:
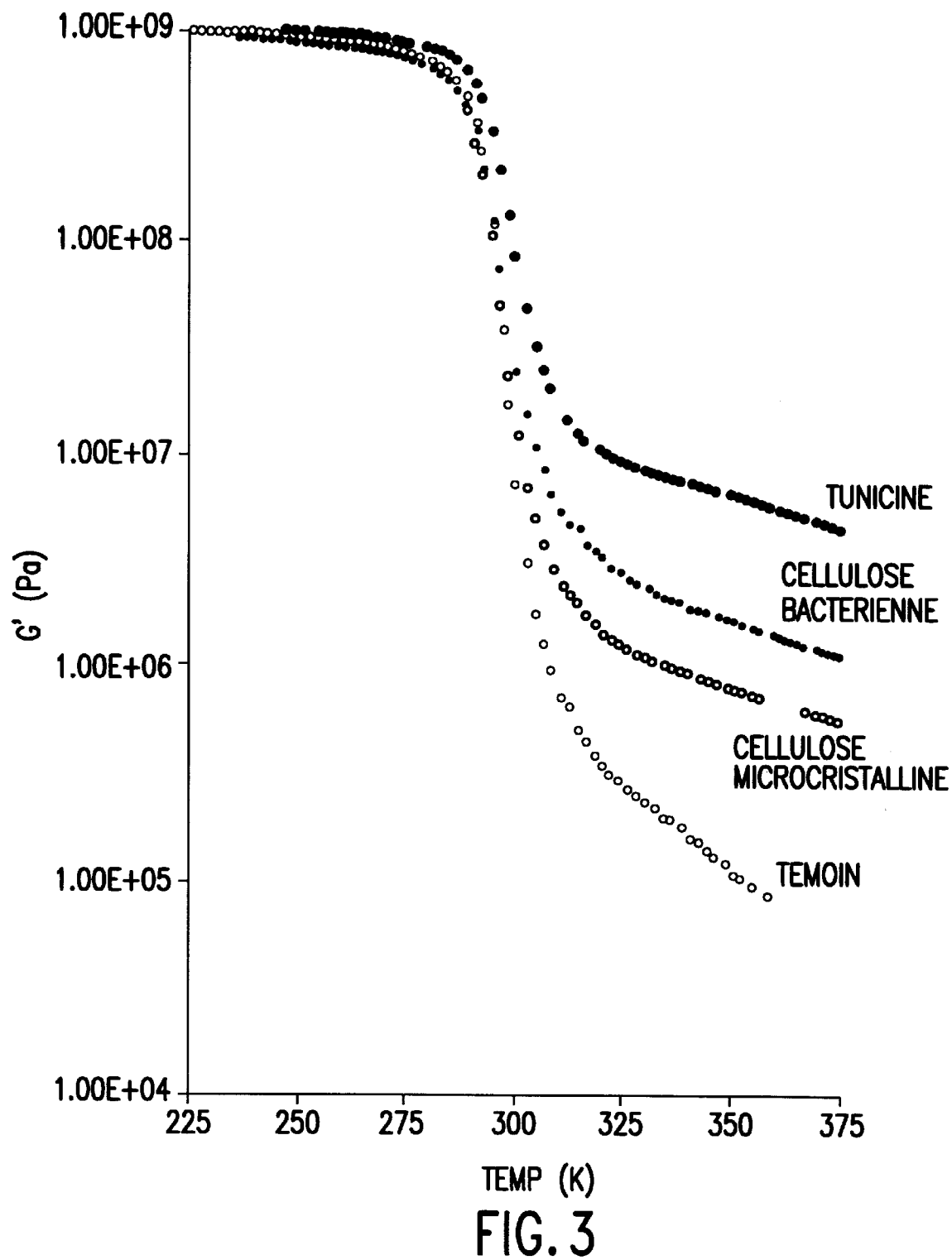
FIG. 3 shows reinforcement obtained by different types of cellulose reinforcements.

According to the process described in Example 3 above, tests pieces were subjected to the dynamic analysis, pieces with the same geometry, but produced according to the technique of the pressed powders with latexes which differ from those of Example 2 in that they are formed by emulsion polymerization of 49% styrene, 49% butyl acrylate, 1% acrylamide, and 1% acrylic acid, and whose temperature of glass transition $T_g$ is +20° C. The curves of FIG. 3 allow one to compare the reinforcement obtained by different types of cellulose reinforcements. The composites tested contained about 6% reinforcement: tunicin microfibrils, bacterial cellulose microfibrils prepared in the laboratory, microcrystalline wood cellulose (these last two were obtained by application of the treatment of Example 1, but applied respectively to a bacterial cellulose and a commercial microcrystalline cellulose). One observes, in the diagram, the considerable power of reinforcement of the tunicin microfibrils, compared with that which is much more modest of the wood cellulose fibrils which is attributed to their association in the form of nonindividualized aggregates and to their very low aspect ratio, or compared with that of the bacterial cellulose fibrils which are long but devoid of rigidity.

Example 5
Viscosity of the reinforced latexes

Figure 4:
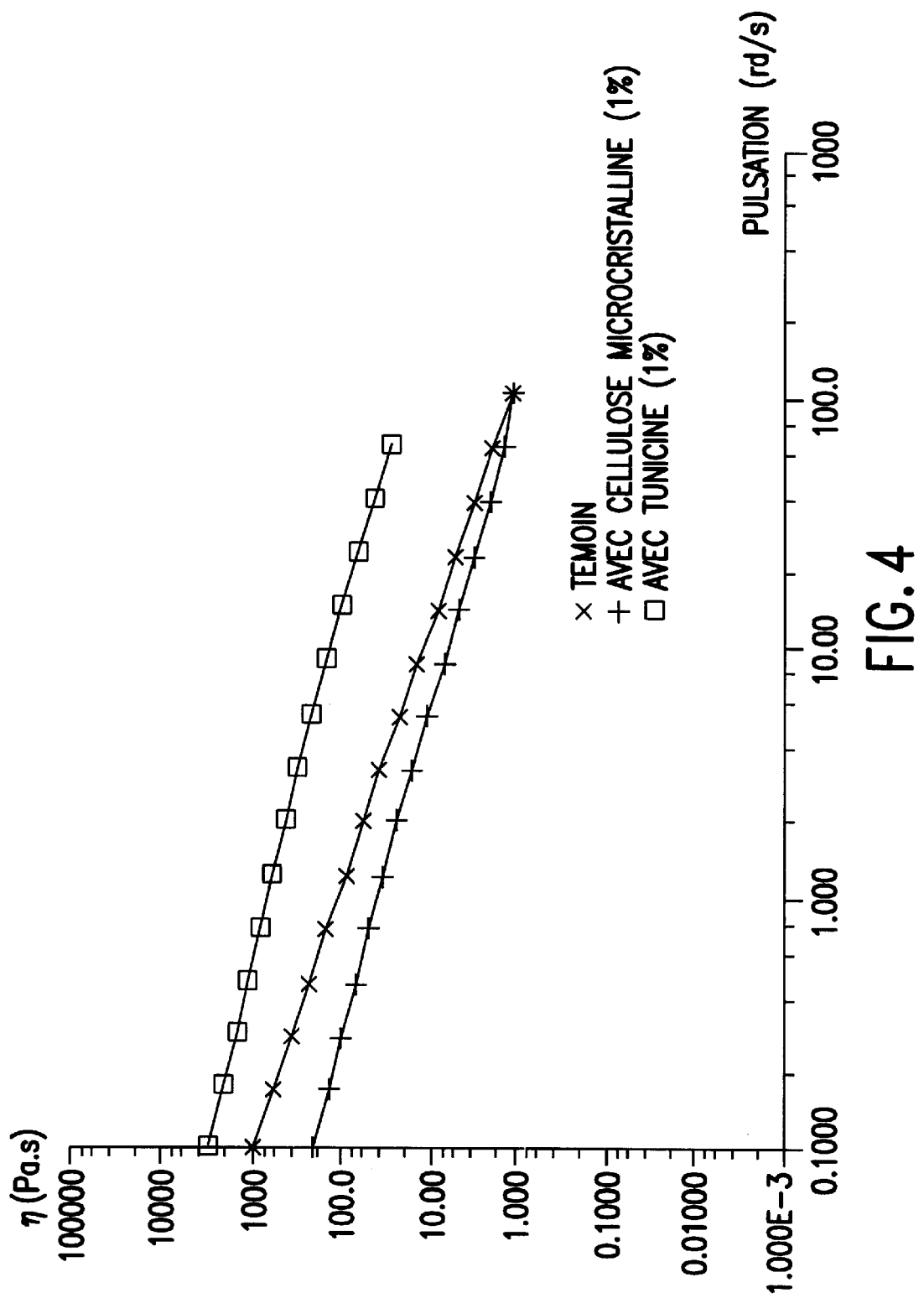
FIG. 4 is a graph of viscosity Pa.s as a function of the pulsation in radians/second.

The latex viscosity was measured with a Carri-Med CSL 100 plane-cone flow meter with imposed stress, functioning dynamic flow. FIG. 4 reports the results on a graph of viscosity Pa·s as a function of the pulsation in radians/second. The control is the acrylic latex of Example 4, which is compared with the same latex with addition, on one hand, of 1% of the microcrystalline cellulose, and on the other hand, of 1% tunicin microfibrils according to the invention as obtained according to Example 1.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A composition comprising an amorphous thermoplastic polymer matrix and a cellulose filler, the cellulose filler having from 1% to less than 15% individualized cellulose microfibrils each formed of a series of microcrystals separated by zones of amorphous cellulose; said microfibrils having an average length greater than a micrometer, a diameter between about 2–30 nm, an aspect ratio greater than 60, and a degree of crystallinity greater than 20%; wherein said microfibrils are selected from the group consisting of tunicin, algae with cellulose-containing walls, parenchymal, and mixtures thereof; and wherein the glass transition temperature of the composition is substantially the same as said matrix but introduction of said microfibrils expresses an increase of relaxation modulus in dynamic mechanics, an increase of slope at the origin, in particular at high temperature, and an increase of stress equivalent to plasticity reversal point.

2. A composition according to claim 1, wherein the microfibrils are tunicin microfibrils.

3. A composition according to claim 1, wherein the microfibrils are microfibrils of algae with cellulose-containing walls.

4. A composition according to claim 1, wherein the microfibrils are parenchymal microfibrils.

5. An aqueous composition comprising a latex polymer and a cellulose filler, the cellulose filler consists of microfibrils according to claim 1, in a stable suspension and individualized in the composition.

6. An aqueous composition according to claim 5, wherein the polymer latex is a latex of a thermoplastic polymer with a glass transition temperature between −40° C. and +90° C.

7. An aqueous composition according to claim 5, wherein the microfibrils are stabilized by the presence of surface charges.

8. An aqueous composition according to claim 7, wherein the microfibrils carry surface charges consisting of sulfate ions.

9. An aqueous composition according to claim 7, wherein microfibrils carry surface charges consisting of phosphate ions.

10. Compositions according to claim 5, wherein the microfibrils are tunicin microfibrils.

11. Compositions according to claim 5, wherein the microfibrils are microfibrils of algae with cellulose-containing walls.

12. Compositions according to claim 5, wherein the microfibrils are parenchymal microfibrils.

13. Films of the composition according to claim 1, wherein they are obtained by evaporation of stable aqueous composition of polymer latex and aqueous suspension of cellulose microfibrils.

14. Powders of the composition according to claim 1, wherein they are obtained by lyophilization of a stable aqueous composition of polymer latex and aqueous suspension of cellulose microfibrils.

15. Rods of the composition according to claim 1, wherein they are obtained by extrusion of a powder of claim 14.

16. Plates of the composition according to claim 15, wherein they are obtained by pressing of the powder of claim 14.

17. Method of making paints, inks or varnishes comprising formulating them with the aqueous composition according to claim 5.

18. Method of making aqueous adhesives or composition for ground surface coverings comprising formulating them with the aqueous composition according to claim 6.

19. Manufacturing of objects of the composition according to claim 1 comprising evaporation of lyophilization of a stable aqueous composition of polymer latex and aqueous suspension of cellulose microfibrils.

20. Manufacturing of objects by pressing or injection respectively of powders according to claim 14.

21. Method of preparing hot melts comprising utilizing powders according to claim 14.

22. A composition according to claim 1, wherein the crystallinity of said microfibrils is greater than 70%.

23. A composition according to claim 1, wherein it contains less than 10% microfibrils.

24. Plates of the composition according to claim 15, wherein they are obtained by pressing of the rods of claim 15.

25. Method of manufacturing rods according to claim 15.

26. Method of preparation of hot melts comprising utilizing the rods according to claim 15.

27. Composition according to claim 1, wherein the polymer matrix is a vinyl latex.

28. Composition according to claim 1, wherein the polymer matrix is butylpolyacrylate, polystyrene or copolymers thereof.

* * * * *